Feb. 9, 1954 — T. ERTL — 2,668,630
LOADING APPARATUS
Filed Jan. 16, 1951 — 2 Sheets-Sheet 1
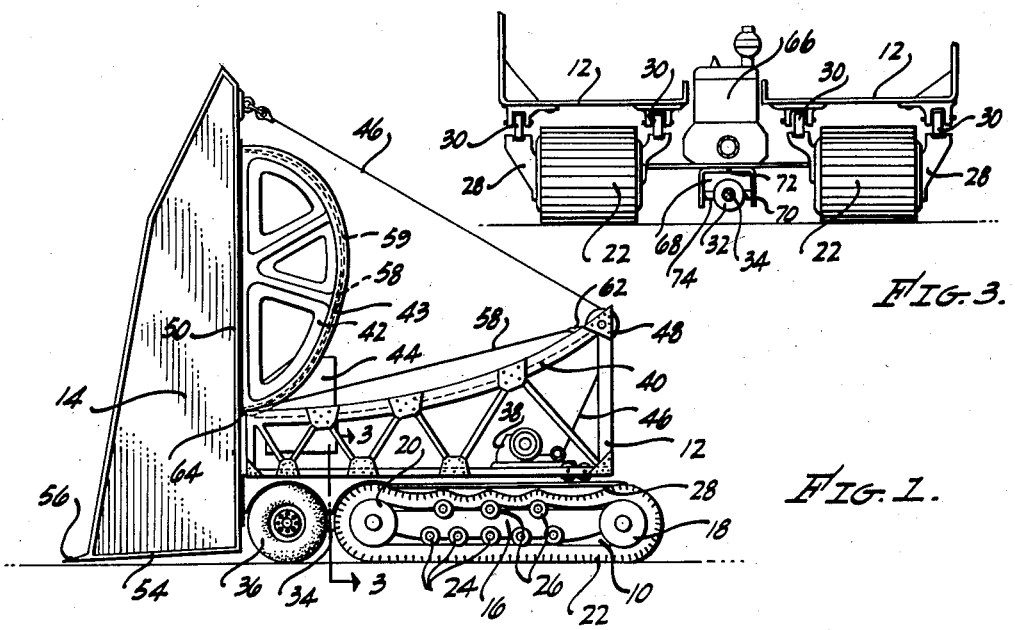
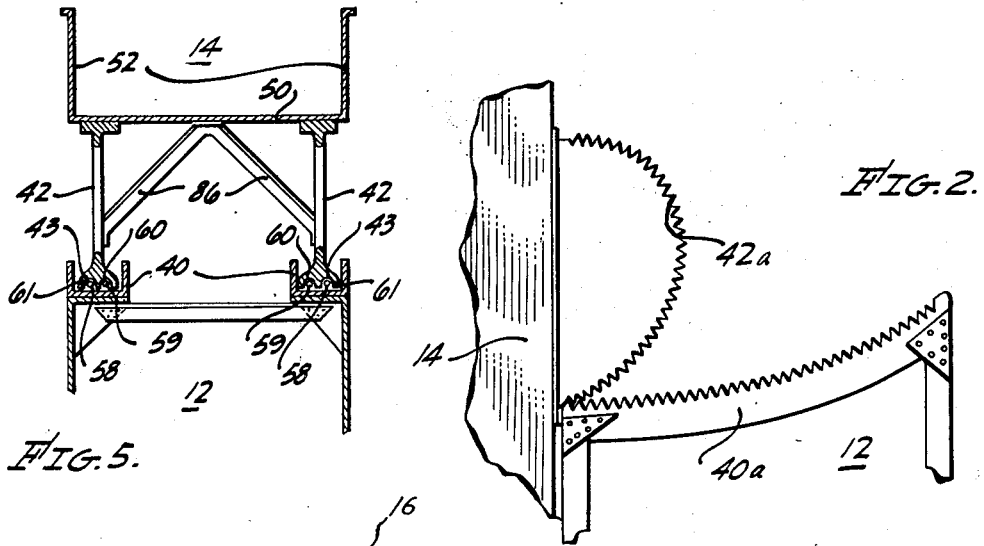
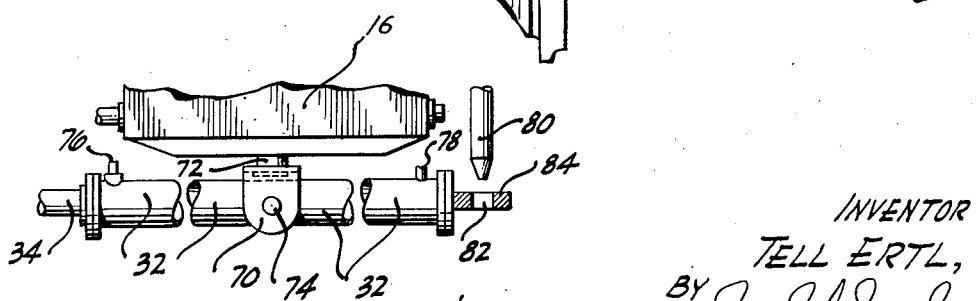
INVENTOR
TELL ERTL,
BY
AGENT.

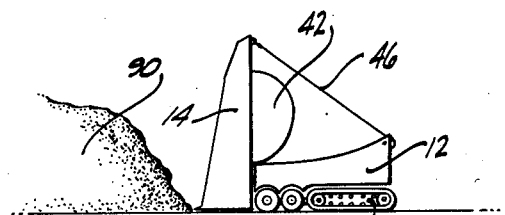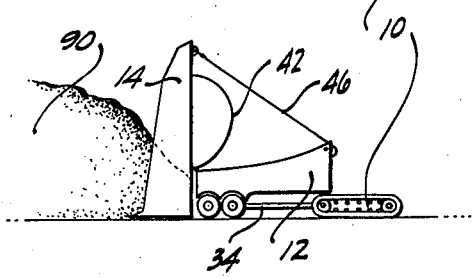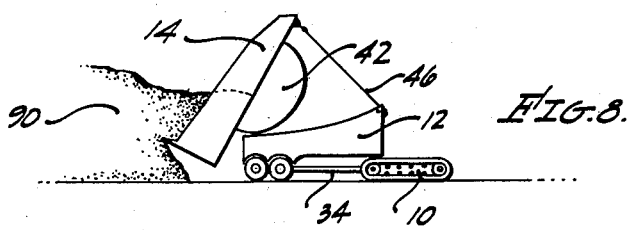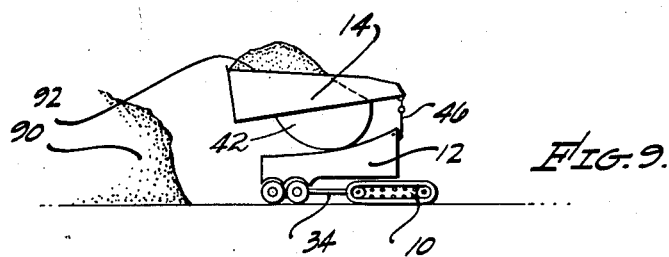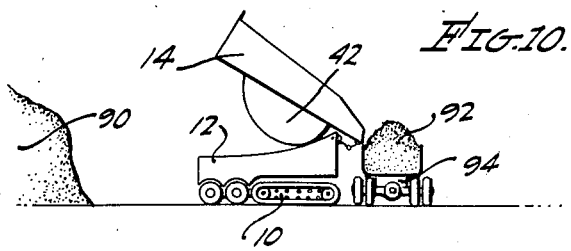

Patented Feb. 9, 1954

2,668,630

UNITED STATES PATENT OFFICE 2,668,630

LOADING APPARATUS

Tell Ertl, Worthington, Ohio, assignor to Union Oil Company of California, Los Angeles, Calif., a corporation of California Application January 16, 1951, Serial No. 206,166

3 Claims. (Cl. 214—131)

This invention relates to a material loading apparatus and in particular relates to a loader for picking up such materials as crushed ore, rock, sand, gravel and other such miscellaneous materials at the forward end of the apparatus and moving them overhead to discharge them rearwardly into trucks or to other delivery points.

Material handling devices for picking up and loading miscellaneous materials which are presently available employ similar overhead movements but in general they are all subject to certain disadvantages. In the usual loading devices the entire mass of the device must be moved with respect to the ground in order to obtain a load of material in the material handling scoop or trough. Thus the entire equipment is shoved forward into a pile of material then moved backward to empty this material at the discharge point. In the device of the present invention a substantial part of the mass of the device, including the power plant, remains stationary and a separate movable carriage carrying the loading trough moves with respect to the ground to pick up a load of material. This is a material improvement since it is found that a much greater thrust into the pile of material to be picked up may be obtained per unit weight of the loading device than when the wheeled or treaded support is moved with respect to the ground. Because of this stationary portion of the device, external and separate bracing with respect to the ground is permitted, allowing a further increase in the loading thrust which the loading device may bring to bear against the material to be loaded. Such features are not possible in the devices previously developed. The placement of trucks for receiving the material to be moved is further simplified in that the discharge point for the material is adjacent the rearward end of the stationary portion of the device. Furthermore, the raising of the material handling trough overhead and rearwardly with respect to the stationary part of the device permits the use of large capacity trucks of considerable height not otherwise usable and the manner of unloading the trough by an easily controllable sliding discharge permits the gentle placement of the materials into the truck. These features are lacking in the devices presently available and it is to the provision of an improved loading device having the aforementioned features that the present invention is directed.

It is a primary object of the present invention to provide an improved material loading and handling device which is provided with a wheeled or treaded crawler stationary in operation and with a reciprocable wheeled carriage carrying a rocking overhead material handling trough.

An additional object is to provide a device for the picking up and discharge of solid materials into a truck or other receiver which is provided with an inherently greater trough-loading thrust per unit weight than heretofore obtainable.

A further object is to provide a material handling and loading device of considerably increased rate capacity by minimizing unnecessary movements.

Other objects and advantages of this invention will become apparent to those skilled in the art as the description thereof proceeds.

Briefly, the present invention comprises an improved combination apparatus for the picking up, movement and discharge of solid materials and which apparatus is provided with three essential parts: a treaded crawler stationary during material handling, a wheeled carriage reciprocable with respect to the crawler during solids handling and an overhead material handling scoop or trough operated in rocking relation above said carriage. In operation the treaded crawler, which may optionally be provided with wheels instead of cleated treads, moves up before accumulation of material to be handled and is stopped. The carriage, partly resting on the ground and partly on guide tracks on the crawler body, is thrust forward into the material with the loading trough tilted forward in a material receiving position with one end parallel to the ground surface. The trough is then rocked with respect to the carriage thereby scooping up a quantity of material from the accumulation by moving forward and upward in the manner of a conventional power shovel. While the rocking motion of the trough is continued, the carriage is returned to its normal position adjacent the crawler and the material is discharged rearwardly at a point immediately adjacent the rear of the stationary crawler. The trough is then rocked forward from the materials discharge position toward the materials receiving position and the carriage and trough are again thrust forward to obtain an additional load of solids. From time to time the crawler is moved with respect to the accumulation of materials but during actual loading and disharge of materials into and out of the trough the crawler remains stationary with respect to the ground.

The general mechanical features and the mode of operation of the device of the present invention will be more clearly understood by reference to the accompanying drawings in which:

Figure 1 is a general side elevation view of the device of the present invention showing the materials loading trough in solids receiving position and the reciprocable carriage in solids discharging position as it would be when the equipment is at rest, Figure 2 shows a side elevation of a modification of the mechanism employed to rock the materials handling trough with respect to the reciprocable carriage without slippage, Figure 3 shows an elevation view of the crawler looking in a rearward direction from the solids receiving end and showing the carriage reciprocating means and the carriage guide wheels resting in the longitudinal carriage guide wheel tracks, Figure 4 shows the swivel and trunnion connection of the carriage reciprocating mechanism employed to mount this mechanism to the crawler body, Figure 5 shows an elevation view in cross section of the materials loading trough and reciprocable carriage showing the overhead guide tracks, and Figures 6 through 10 indicate in sequence the positions of the various parts of the present apparatus during the pick up and discharge of solids into a truck.

Referring now more particularly to Figure 1, the device of the present invention is provided with three essential elements, the treaded crawler 10, the reciprocable wheeled carriage 12 and rocking materials handling trough 14. The crawler is provided with a chassis or crawler body 16 to which drive wheels 18 and 20 are attached and about which cleated tread 22 extends. Crawler body 16 is further provided with support wheels 24 and with idler wheels 26. A main power plant, not shown in Figure 1 but indicated in Figure 3, is also supported on the crawler body and between two sets of treads 22 also indicated generally in Figure 3.

The crawler body further supports a plurality of longitudinal carriage guide wheel tracks 28 along which carriage guide wheels 30 run and support the discharge end of carriage 12.

Also provided is a carriage reciprocating means 32 not shown in Figure 1 but indicated in Figures 3 and 4 and provided with connecting means 34 whereby carriage 12 is reciprocated along the longitudinal axis of crawler 10.

Carriage 12 is supported by means of guide wheels 30 mentioned before and carriage support wheels 36 which ride on the ground surface. Carriage 12 is preferably an open type structure fabricated from structural steel members for maximum strength with minimum weight. The carriage is further provided with a power plant 38 for rocking materials handling trough 14 with respect to the carriage and to effect the movement and discharge of granular solids in and from the trough. Further, the upper members 40 of the carriage are overhead guide tracks in which the curved trough supports 42 of loading trough 14 move in a rolling or rocking relation. The carriage 12 is further provided with operator's cab 44 which may be suspended between the side frames of carriage 12 or outside the carriage and supported from either of the side frames. At least one hoist cable or chain 46, and preferably two of them, run from power plant 38 through sheaves 48 to the discharge end of trough 14. By drawing up cable or chain 46, trough 14 rocks by means of curved trough supports 42 in overhead guide tracks 40 and picks up and raises a trough-load of material to the discharge position which is more clearly indicated in the series of Figures 6 to 10. The trough returns to the solids receiving position by gravity and by paying out cables 46 from power plant 38.

It is to be noted that although only two carriage supporting wheels 36 are indicated in Figure 1, a plurality of preferably 4, 6, 8 or more such wheels be employed to support the weight of large modifications of this invention designed especially for handling large quantities of material in each loading of the trough.

Loading trough 14 is preferably of generally rectangular cross section with a flat bottom 50 and with substantially vertical sides 52. The general cross section is indicated in Figure 5. The solids receiving end of the loading trough is preferably provided with a flat wall or end 54 which may be provided with a toothed material engaging lip 56.

To insure against slippage of curved rims 43 of trough supports 42 with respect to the overhead guide tracks 40 one of two modifications may be employed. The first is shown in Figures 1 and 5 and indicates at least one support cable 58 and preferably two or more extending from the point of overhead guide track 40 nearest sheaves 48 to a point defined by the junction of cable groove 60 and the trough bottom 50 nearest the material receiving end of trough 14. This support cable 58 therefore runs from point 62 to point 64 as shown in Figure 1. Rim 43 of trough support 42 is provided with cable groove 60 in the outside or bearing surface in which support cable 58 rides.

Another support cable 59 runs in cable groove 61 parallel to cable 58 in groove 60. One end of cable 59 is attached to frame 12 at the materials loading end where point 64 comes in contact with frame 12. The other end is attached to the trough bottom 50 at the discharge end of trough support 42. Thus when hoist cables 46 are placed under tension as in lifting and discharging of materials, a tension is also placed on support cables 58 and 59 and the movement resulting from trough 14 causes support cable 58 to wind up in cable groove 60 of trough support 42 and cable 59 to unwind from cable groove 61, thus preventing slippage of rims 43 with respect to overhead guide tracks 40. It is to be noted that trough 14 is provided with two curved trough supports 42, one each riding in the two overhead guide tracks 40 integral with reciprocable carriage 12.

Referring now more particularly to Figure 2, a modified form of means for preventing the trough support slippage referred to is shown in which toothed trough supports 42a are replaced for the rimmed supports shown in Figure 1. Similarly, toothed overhead guide tracks 40a are replaced for the ones shown in Figure 1. In Figure 2, when trough 14 is to be lifted and moved rearwardly with a load of material, supports 42a roll rearwardly (to the right in the drawing) with teeth engaging the teeth in each overhead guide track 40a. Either method of preventing slippage may be used although that indicated in Figure 1 is preferable for structural reasons.

Referring to Figure 3, an elevation view in a transverse plane of the crawler and the lower portion of the reciprocable carriage 12 is shown. Mounted between crawler treads 22 is main power plant 66. A plurality of carriage guide wheels 30 are shown riding in longitudinal carriage guide wheel tracks 28 described previously. If desired, only two such guide wheel tracks may be employed either inside or outside of treads 22. In larger modifications of the apparatus, however, four guide wheel tracks and possibly more are required. In the event that more than four such tracks are required these are placed above the treads by providing additional tracks supported there from the crawler body.

Carriage reciprocating means 32 is shown which is connected to the crawler body by means of swivel and trunnion connection 68 further described in Figure 4. The swivel and trunnion connection consists of yoke 70 provided with swivel 72 connected to the crawler body. Yoke 70 surrounds reciprocating means 32 and is attached thereto by means of a pair of trunnions 74. By this means the carriage reciprocating means may turn through a restricted arc in a horizontal plane and through a restricted arc in a vertical plane so that the reciprocating thrust from means 32 may be applied to the carriage though the surface on which the device operates is not flat.

Referring to Figure 4, an additional view of the attachment of reciprocating means 32 to the crawler 10 is shown. In this instance a hydraulic cylinder is indicated as reciprocating means 32 and provided with shaft 34. Connections 76 and 78 are for hydraulic fluid inlet and outlet to and from the cylinder. Pin 80 may be lowered through hole 82 in clip 84 so that the movement of hydraulic cylinder 32 may be restricted to an arc in a vertical plane. By lowering pin 80 in this manner carriage 12 reciprocates only along the longitudinal axis of the entire device. This is of considerable importance during loading of granular solids into and out of the trough. However, pin 80 may be raised and disengaged from clip 84 so that during relocation of the device during loading and on highways, the carriage may be pulled behind the crawler easily around corners in the manner of a trailer.

Referring now to Figure 5, a cross sectional elevation view of the loading trough 14, trough supports 42 braced by members 86, overhead trough support guide tracks 40 supported on carriage 12 are shown. The manner in which support cables 58 and 59 ride in the cable grooves 60 and 61 of support rims 43 is clearly indicated.

Referring now particularly to Figures 6 through 10, a sequence of drawings showing the movement of the three essential elements of the apparatus is shown. It will be noted that in all of these figures the position of crawler 10 is stationary while the other portions move with respect to one another in such a manner as to accomplish the objects of this invention.

In Figure 6, carriage 12 is drawn adjacent to crawler 10 and trough 14 is maintained in its vertical solids receiving position and immediately adjacent to an accumulation 90 of material to be loaded.

In Figure 7, carriage 12 is extended by means of thrust bar 34 into the material to be loaded. It will be noted that a considerable portion of the material enters loading trough 14 by means of this motion.

In Figure 8, hoist cables 46 have been placed under tension with the carriage retained at its solids receiving position thus pushing forward and raising trough 14 and moving it in rocking or rolling relation to carriage 12 and scooping up additional quantities of material from the accumulation 90.

In Figure 9, trough 14 is shown containing a load of material 92 moving overhead toward its discharge position while at the same time reciprocating shaft 34 is returning carriage 12 to the solids discharging position.

In Figure 10, loading trough 14 and carriage 12 are both shown in their solids discharging position and load 92 has been transferred to truck 94.

It is to be noted that in Figures 1, 2 and 6 through 10 there is a marked curvature of overhead guide tracks 40. The reason for this curvature is twofold: First, by providing a horizontal section of overhead guide tracks 40 adjacent the solids receiving end of carriage 12, a mechanical advantage is attained in raising trough 12 by means of hoist cables 46. Second, by having a rise in the overhead guide tracks from the solids receiving toward the solids discharging end the load is effectively raised to a sufficient height to permit ready discharge into truck bodies of considerable height above the ground. The device is operable with a guide track horizontal throughout its length and with a guide track which is convex upward but it is preferred to have a guide track sloping upwardly toward the discharge end and which may be straight and, even more preferable, to have a guide track horizontal at the solids receiving end and sloping upwardly at an increasing rate toward the solids discharging end.

In Figures 1, 2 and 6 through 10 it will be noted also that the radius of curvature of trough supports 42 is not constant but is greater at the solids discharge end than at the solids receiving end of the support. The reasons for this are also twofold: First, by having a short radius of curvature in the trough support nearest the solids receiving end of the trough an increased mechanical advantage or leverage is attainable where it is most needed; namely, in overcoming the resistance of the solids in the accumulation and obtaining a load of solids in the trough. Secondly, by having a larger radius of curvature at the opposite end of the trough supports the hoist is able for a constant cable speed to move the trough load faster from the receiving to the discharging positions, thus effecting a reduction in time required in moving the solids between these two positions and in the operator's necessary manipulations of the controls. Thus a constant hoist cable speed provides a great leverage at low speed when filling the trough and a decreased leverage at higher speed when moving and discharging the trough.

In the present specification and drawings, means have been shown for reciprocating the carriage with respect to the crawler. It is to be understood that this may be any of the conventional mechanical means for effecting a reciprocal motion and that the preferred form, the utilization of a hydraulic cylinder, may be substituted for a rack and pinion gear system to effect the same result. Such open gear systems are less preferred since they are adversely affected by accumulations of solids and must be lubricated and maintained to a greater extent than the hydraulic system.

Preferably two separate power plants are employed, one mounted on the crawler body for moving the entire apparatus into loading positions and another power plant mounted on the reciprocal carriage for moving the loading trough in a rolling relation to the carriage. If desired, a power takeoff may be employed in the main power plant to substitute for the hoisting power plant.

As an example of the size and capacity of a typical loading device design and constructed according to the principles of the present invention the following data are representative of a loading device having a capacity of 25 tons per load in the trough and an approximate loading capacity of 750 tons per hour. The maximum height of the apparatus is 37 feet, the maximum length with the carriage extended is 43 feet, the width between the outside of the treads is 17 feet and the weight unloaded is 225,000 pounds.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A material loading device which comprises a treaded crawler body provided with motive means for the treads and supporting longitudinal carriage guide wheel tracks, a wheeled carriage, carriage guide wheels attached to the material discharging end of said carriage and riding along said longitudinal tracks, carriage support wheels attached to the material receiving end of said carriage and riding on the ground, overhead curved guide tracks supported at the upper part of said carriage and which rise in a curve of increasing upward slope from the material receiving end of said carriage, a carriage reciprocating shaft connecting said carriage with said crawler body, motive means for reciprocating said shaft to reciprocate said carriage along the ground with respect to said crawler body and independently of crawler body motion, a material receiving and delivering trough in rocking relation to and supported in said overhead trough guide tracks of said carriage, and motive means for imparting a rocking motion to said trough, said device being adapted to the reciprocation of said carriage and rocking of said trough between material receiving and discharging positions independently of each other and of crawler body movement.

2. A material loading device according to claim 1 wherein said overhead curved guide tracks supported on said carriage are substantially parallel with the longitudinal axis of said crawler body at the material receiving end and curve upwardly toward the material discharging end of said carriage.

3. A material loading device which comprises a treaded power driven crawler body provided with longitudinal carriage guide wheel tracks, a wheeled carriage provided with support wheels riding on the ground surface adjacent the material receiving end of said carriage and carriage guide wheels riding along said longitudinal tracks of said crawler body, overhead trough support guide tracks supported at the upper part of said carriage and rising in a curve of increasing slope toward the material discharge end of said carriage, motive means attached by means of a swivel and trunnion connection to said crawler body for reciprocating said carriage longitudinally along the ground with respect to and independently of movement of said crawler body, a material holding trough provided intermediate its receiving and delivery ends with rocker supports having curved rims, said curved rims riding on the overhead support guide tracks of said carriage carrying said trough from a forward material receiving position in a curved path rearwardly above said carriage and crawler body to a material discharging position, means for preventing slippage of said curved rims while rolling on said overhead guide tracks, and motive means for independently rocking said material holding trough with respect to said carriage between said material receiving and discharging positions.

TELL ERTL.

References Cited in the file of this patent

UNITED STATES PATENTS

| Number | Name | Date |
|---|---|---|
| 443,574 | Hartman | Dec. 30, 1890 |
| 947,902 | Glise | Feb. 1, 1910 |
| 1,286,168 | Billings et al. | Nov. 26, 1918 |
| 1,472,907 | Gow | Nov. 6, 1923 |
| 1,526,830 | Byrne | Feb. 17, 1925 |
| 1,551,466 | Butler | Aug. 25, 1925 |
| 2,041,734 | Wilcox | May 26, 1936 |
| 2,273,029 | Eilersgaard | Feb. 17, 1942 |
| 2,320,601 | Howell | June 1, 1943 |
| 2,467,029 | Greenway | Apr. 12, 1949 |
| 2,495,138 | Royle | Jan. 17, 1950 |
| 2,507,548 | Sherwood | May 16, 1950 |